(12) United States Patent
Smith et al.

(10) Patent No.: US 11,713,996 B2
(45) Date of Patent: Aug. 1, 2023

(54) FOLDING PORTABLE LUGGAGE SCALE

(71) Applicant: Weigh Ahead, LLC, Vero Beach, FL (US)

(72) Inventors: William Smith, Vero Beach, FL (US); Cameron Smith, Steamboat Springs, CO (US)

(73) Assignee: WEIGH AHEAD, LLC, Vero Beach, FL (US)

( * ) Notice: Subject to any disclaimer, the term of this patent is extended or adjusted under 35 U.S.C. 154(b) by 0 days.

(21) Appl. No.: 17/889,814

(22) Filed: Aug. 17, 2022

(65) Prior Publication Data

US 2022/0390270 A1 Dec. 8, 2022

Related U.S. Application Data

(63) Continuation-in-part of application No. 17/229,586, filed on Apr. 13, 2021.

(60) Provisional application No. 63/389,758, filed on Jul. 15, 2022, provisional application No. 63/137,134, filed on Jan. 13, 2021.

(51) Int. Cl.
*G01G 21/22* (2006.01)
*G01G 21/28* (2006.01)

(52) U.S. Cl.
CPC ........... *G01G 21/22* (2013.01); *G01G 21/283* (2013.01)

(58) Field of Classification Search
CPC .............................. G01G 21/22; G01G 21/283
USPC ........................................................ 177/126
See application file for complete search history.

(56) References Cited

U.S. PATENT DOCUMENTS

| | | | |
|---|---|---|---|
| 1,992,262 A | 2/1935 | Upp | |
| 4,711,313 A | 12/1987 | Iida et al. | |
| 5,065,830 A | 11/1991 | Stevenson | |
| 6,337,446 B1 * | 1/2002 | Hulburt | G01G 19/44 177/127 |
| 6,781,067 B2 * | 8/2004 | Montagnino | G01G 19/44 177/173 |
| 7,022,920 B2 * | 4/2006 | Hulburt | G01G 21/22 177/126 |
| 7,692,107 B1 | 4/2010 | Shotey | |
| 9,084,018 B2 | 7/2015 | Nishigai | |
| 9,174,831 B2 * | 11/2015 | Rothkegel | G01G 3/141 |
| 10,260,934 B2 | 4/2019 | Esmail et al. | |
| 11,237,039 B2 | 2/2022 | Swanson | |
| 2002/0113715 A1 | 8/2002 | Wilson | |
| 2005/0072604 A1 | 4/2005 | Hulburt et al. | |
| 2008/0035391 A1 | 2/2008 | Jewett | |
| 2010/0300768 A1 | 12/2010 | Reiter | |

(Continued)

OTHER PUBLICATIONS

Office Action 1 for U.S. Appl. No. 17/229,586, dated Oct. 6, 2022.

(Continued)

*Primary Examiner* — Randy W Gibson
(74) *Attorney, Agent, or Firm* — Tope-McKay & Associates

(57) ABSTRACT

Described is a folding portable luggage scale. The folding portable luggage scale includes multiple folding arms connected via hinges, multiple load sensors, and an electronics housing including electronic components and a digital display. Electrical wires connect each load sensor with the electronics housing. The folding portable luggage scale is compact and lightweight for storage in luggage during travel.

20 Claims, 20 Drawing Sheets

(56) References Cited

U.S. PATENT DOCUMENTS

2016/0374516 A1 12/2016 Lammel
2017/0227395 A1 11/2017 Esmail
2020/0348165 A1 11/2020 Lambeth

OTHER PUBLICATIONS

Notification of and Transmittal of the International Search Report and the Written Opinion of the International Searching Authority for PCT/US2022/040650; dated Jan. 9, 2023.

* cited by examiner

FOLDING PORTABLE LUGGAGE SCALE

CROSS-REFERENCE TO RELATED APPLICATIONS

This is a Continuation-in-Part Application of U.S. application Ser. No. 17/229,586, filed in the United States on Apr. 13, 2021, entitled, "Suitcase Weighing Luggage Rack," which is a Non-Provisional Application of U.S. Provisional Application No. 63/137,134, filed in the United States on Jan. 13, 2021, entitled, "Suitcase Weighing Luggage Rack," the entirety of which are incorporated herein by reference.

This is also a Non-Provisional Application of U.S. Provisional Application No. 63/389,758, filed in the United States on Jul. 15, 2022, entitled, "Folding Portable Luggage Scale," the entirety of which is incorporated herein by reference.

BACKGROUND OF INVENTION

(1) Field of Invention

The present invention relates to a folding luggage scale and, more particularly, to a folding luggage scale that is portable and can be stored in luggage during travel.

(2) Description of Related Art

Most airlines have strict weights limits for checked luggage/baggage. Upon check-in, the luggage is weighed by the airline employee. If the luggage exceeds the airline's limit, the traveler must either remove items from the luggage to reduce its weight, or pay a fee. If the traveler decides to remove items from the luggage, the traveler often has to open his bag on the floor in front of the agent in a hurried and embarrassing manner and then reweigh in front of the agent to see if they are now under the limit. Every traveler would like to avoid this situation.

There are currently handheld spring scales that can be used to weigh luggage prior to checking luggage at the airline counter. These devices attach to a handle of a suitcase or bag in order to weigh the luggage. To use these devices, the user attaches the device to the handle of the luggage, holds the weighing device, and allows the luggage to hang from the device in order to obtain a weight of the luggage item. The disadvantage of these types of devices is that the luggage must be closed prior to weighing; otherwise, the personal items in the luggage will fall out. Therefore, the user must weigh the zipped luggage, place the luggage down, unzip the luggage, remove, or add more personal items, and then weigh the luggage again. This is an inconvenient and imprecise process. Additionally, it is very difficult for many people such as the elderly, unwell and small-statured to repeatedly lift luggage weighing 50 pounds or more using a hand-held spring scale.

Thus, a continuing need exists for a luggage scale that allows a user to accurately weigh their luggage while they are packing in their home or hotel room with the confidence that when they reach the airline check-in counter they are at the weight limit and not over.

SUMMARY OF THE INVENTION

The present invention relates to a folding luggage scale and, more particularly, to a folding luggage scale that is portable and can be stored in luggage during travel. The folding luggage scale includes folding arms connected via hinges, load sensors, an electronics housing, including electronic components and a digital display, and electrical wires connecting each load sensor with the electronics housing.

In another aspect, the wires are housed in a combination of the folding arms and at least one hinge.

In another aspect, one or more of the hinges comprises a load sensor housing having a load sensor therein.

In another aspect, the load sensors comprise four load sensors.

In another aspect, the load sensors comprise five load sensors.

In another aspect, each folding arm is a substantially hollow tube.

In yet another aspect, at least one of the folding arms comprises an extension mechanism.

In another aspect, at least one of the electronic components is a printed circuit board (PCB).

In another aspect, the PCB comprises a microcontroller unit (MCU).

In yet another aspect, the electrical wires comprise at least two electrical wires of different lengths.

In another aspect, the electronics housing is configured to wirelessly communicate with a mobile software application.

In another aspect, the electronics housing is positioned at one of the pair of ends of one of the folding arms.

In another aspect, the electronics housing is positioned along the length of one of the folding arms between the pair of ends.

In another aspect, the hinges are embedded withing a central body member, and each folding arm extends radially from the central body member.

The present invention further relates to a method for forming a folding portable luggage scale. Folding arms are connected via hinges. A load sensor is attached with at least one folding arm. Using electrical wires, each load sensor is connected with an electronics housing comprising electronic components and a digital display.

In another aspect, the method includes positioning the electrical wires within a combination of the folding arms and at least one hinge.

In another aspect, the method includes forming the folding arms to be substantially hollow tubes.

In another aspect, at least one of the folding arms is formed to be extendable.

In another aspect, the method includes forming at least two of the electrical wires to have different lengths.

In another aspect, the electronic housing is configured to be capable of wirelessly communicating with a mobile software application.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a folding luggage scale and, more particularly, to a folding luggage scale that is portable and can be stored in luggage during travel. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Specific Details of Various Embodiments

Figure 1:
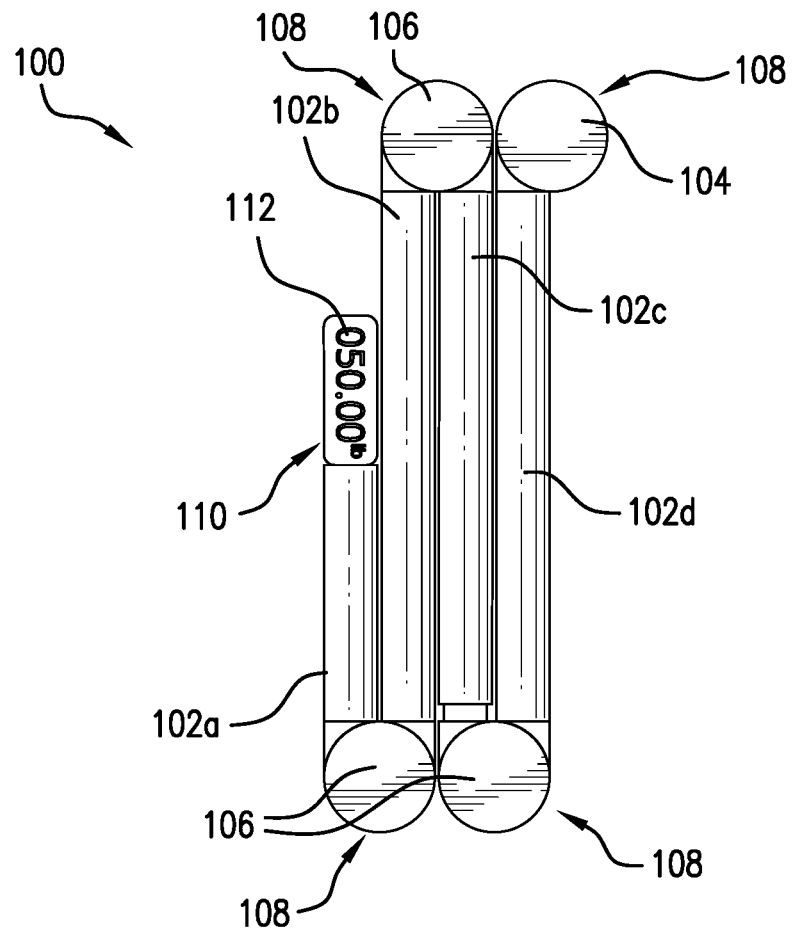
FIG. 1 is top-view illustration of a folding luggage scale in a folded position according to embodiments of the present disclosure.

The invention described herein is a portable folding luggage scale. FIG. 1 is a top-view illustration of one embodiment of a folding luggage scale (100) depicted in a folded, portable position. As shown, the folding luggage scale (100) comprises four folding arms (102a), (102b), (102c), and (102d) connected via either endpoints, which are not movable, (104) or hinges (106). The hinges (106) may rotate or move in any suitable manner which allows the folding arms (102a), (102b), (102c), and (102d) to be moved into their folded, compact position. In one or more embodiments, the movement of each hinge (106) will be limited in direction and/or degree of motion. In one or more embodiments, the hinges (106) are rotatable hinges, and the degree of rotation may be limited. Any limitation to movement will be implemented in order to make folding of the folding arms (102a), (102b), (102c), and (102d) intuitive for the user as well as to prevent damage of any wires housed within the folding arms (102a), (102b), (102c), and (102d).

In some embodiments, each endpoint (104) is substantially similar in size and shape as the hinges (106). While the endpoints (104) do not move/rotate, each endpoint (104) is positioned at the end of a folding arm (e.g., 102*d*) and is formed to correspond in appearance to the hinges. In some embodiments, an endpoint (104) provides another support surface for luggage placement. In one or more embodiments, the folding arms (102*a*), (102*b*), (102*c*), and (102*d*) are elongated, rod-like, mostly hollow tubes comprised of aluminum; however, other types of material may be used for the folding arms (102*a*), (102*b*), (102*c*), and (102*d*), such as plastic, carbon fiber, and steel. Each folding arm is comprised of a pair of ends and a length that extends between the pair of ends. The folding arms (102*b*), (102*c*), and (102*d*) are substantially straight and sturdy to provide a stable surface for luggage of all shapes and weights. Additionally, the folding arms (102*a*), (102*b*), (102*c*), and (102*d*) may be formed in any shape, such as cylindrical, triangular, rectangular, or square. Alternatively, the folding arms (102*a*), (102*b*), (102*c*), and (102*d*) may be substantially solid rather than mostly hollow, provided that there is sufficient space to allow electronic wires to traverse the folding arms (102*a*), (102*b*), (102*c*), and (102*d*).

Figure 22:
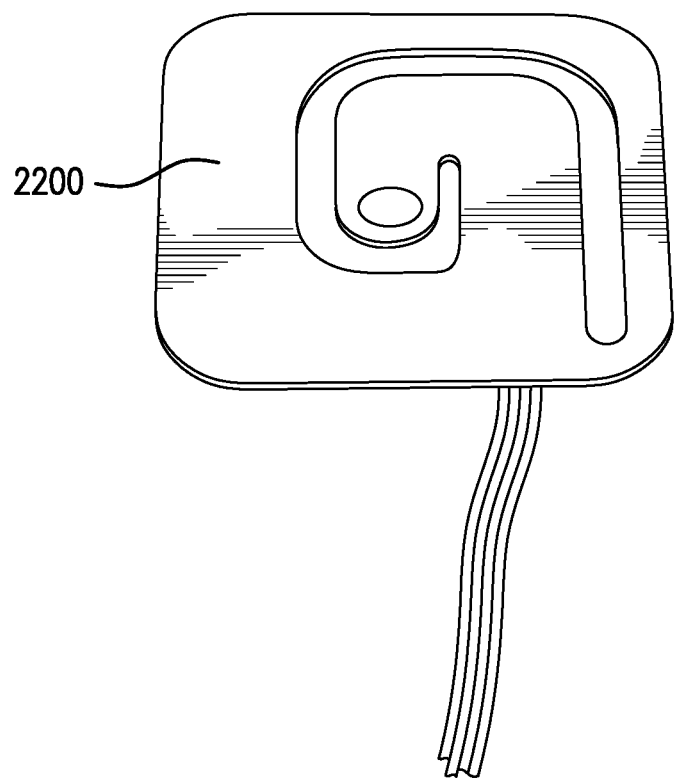
FIG. 22 is an illustration of a load sensor according to some embodiments of the present disclosure.

The folding luggage scale (100) further comprises a plurality of load sensor housings (108). The load sensor housings (108) may be located within a hinge (106), an endpoint (104), or one or more of both depending on the embodiment. Each load sensor housing consists of a load sensor (2200), such as depicted in FIG. 22, and an outer member that covers at least a portion of the load sensor (2200). FIG. 22 illustrates a load sensor which will be described in further detail below.

Referring to FIG. 1, the hinges (106) provide the mechanism by which the folding arms (102*a*), (102*b*), (102*c*), and (102*d*) are folded to form the compact and portable folding luggage scale (100). In some embodiments, the load sensor housings (108) may be the portion of the folding luggage scale (100) in direct contact with the ground, or another surface, when weighing luggage.

In other embodiments, the folding luggage scale (100) described herein may be formed to be used on any surface (e.g., floor, tabletop, carpet, flat bedding) and may be attachable to an existing luggage rack having rails (e.g., metal tubes, flat wooden rails, angled rails) via a set of universal foot elements (not shown). The set of universal foot elements may be attached to the bottom of a push plate in the load sensor housings (108) via an attachment mechanism, such as a screw.

An electronics housing (110) having a digital display (112) may be attached with one or more of the folding arms (e.g., 102*a*) of the folding luggage scale (100) via a connection element that provides a secure and permanent attachment between the electronics housing (110) and at least one folding arm. In some embodiments (FIGS. 1-5), the electronics housing (110) is positioned at an end of a folding arm. In other embodiments (FIGS. 6-15), the electronics housing (610) is positioned along the length of a folding arm.

Figure 18:
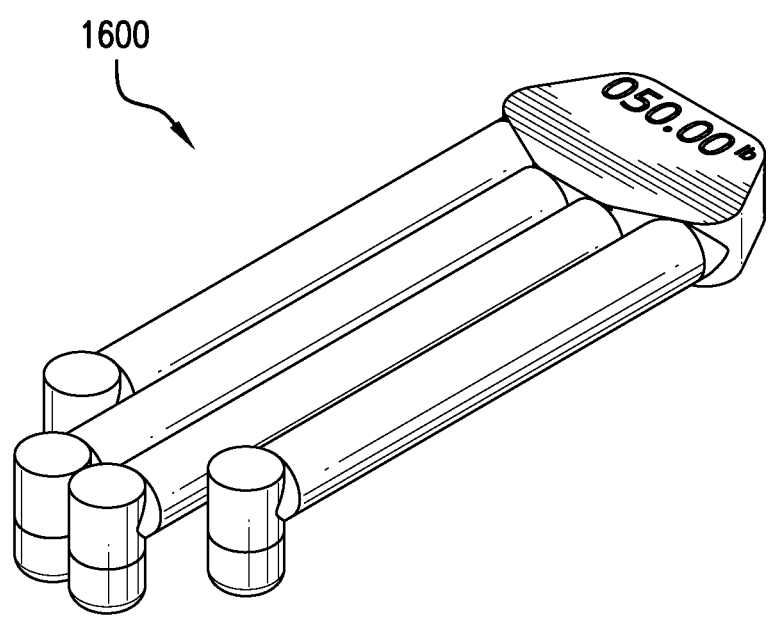
FIG. 18 is a top, perspective-view illustration of the folding luggage scale in FIG. 16 according to embodiments of the present disclosure.
Figure 19:
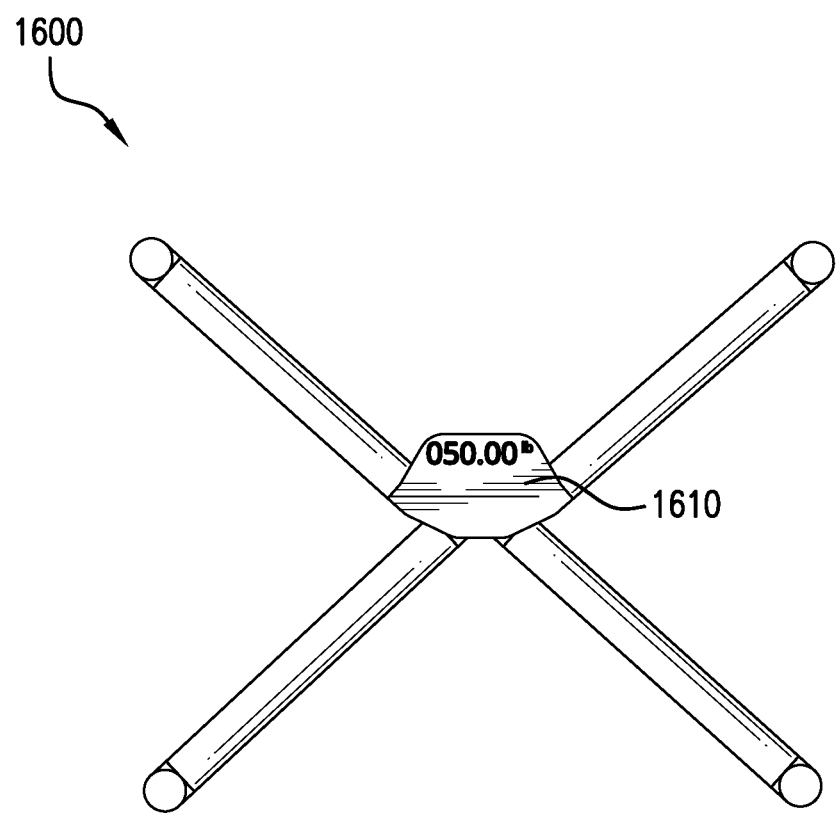
FIG. 19 is a top-view illustration of the folding luggage scale in FIG. 16 in an unfolded, functional position according to embodiments of the present disclosure.
Figure 20:
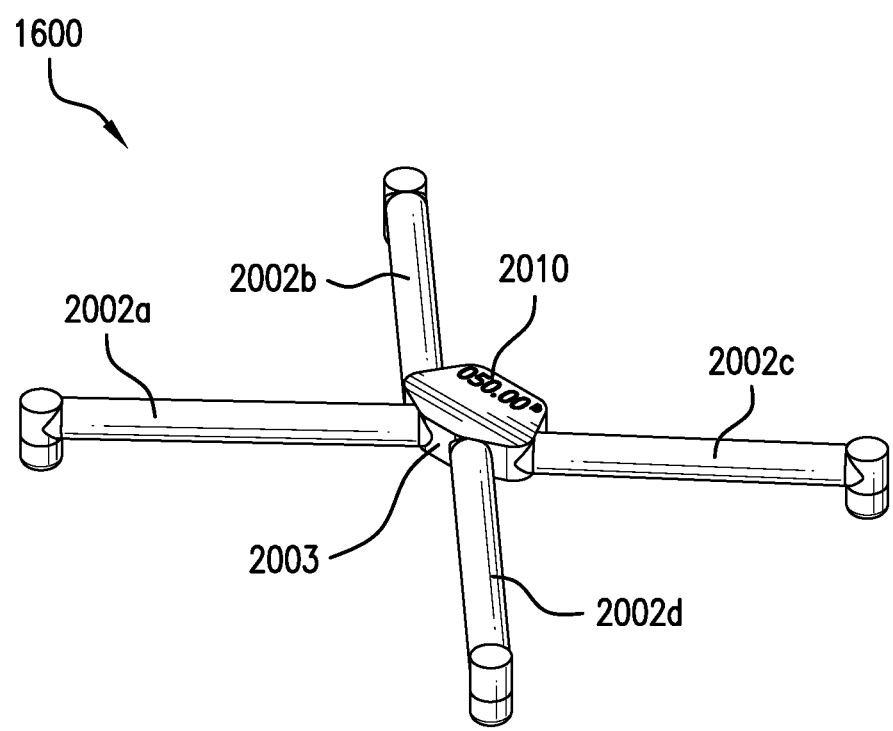
FIG. 20 is a top, perspective-view illustration of the folding luggage scale in FIG. 16 in its unfolded, functional position according to embodiments of the present disclosure.
Figure 23:
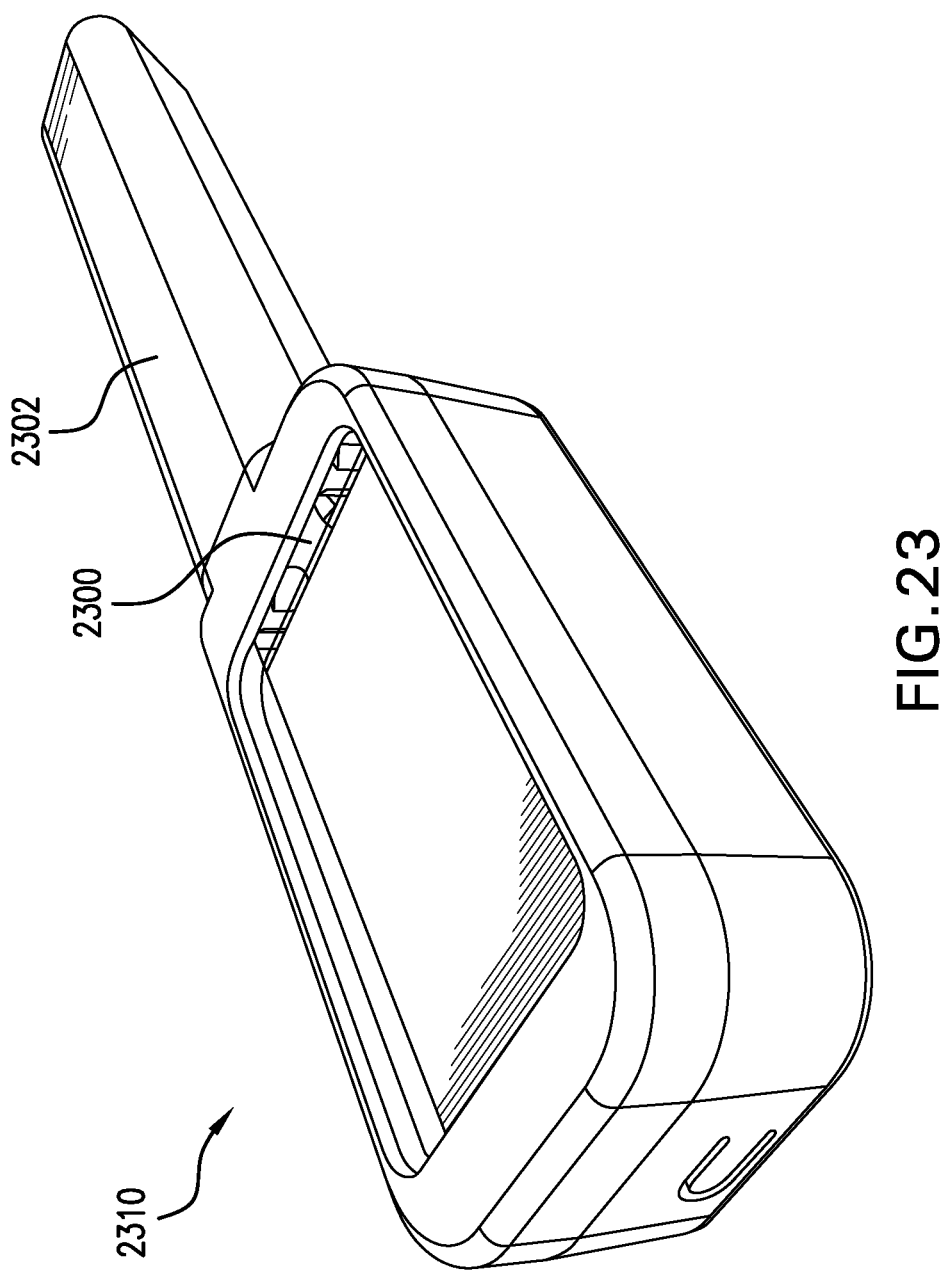
FIG. 23 is an illustration of an electronics housing according to some embodiments of the present disclosure.

FIG. 16-20 depict yet another embodiment of the folding luggage scale (1600), where the electronics housing (1610) is positioned at a center of the folding luggage scale (1600) when it is unfolded. In this embodiment, the folding arms (2002*a*), (2002*b*), (2002*c*), and (2002*d*) are hingedly connected to one another via a plurality of hinges embedded within a central body member (2003), as shown in FIG. 20. The electronics housing (2010) is attached with a top surface of the central body member (2003). As illustrated in FIG. 20, each folding arm extends radially from the central body member (2003). FIG. 23 depicts an embodiment of the electronics housing (2310) comprising a plastic carrier housing (or other material) that is formed to house the electronic components of the electronics housing (2310).

Figure 24:
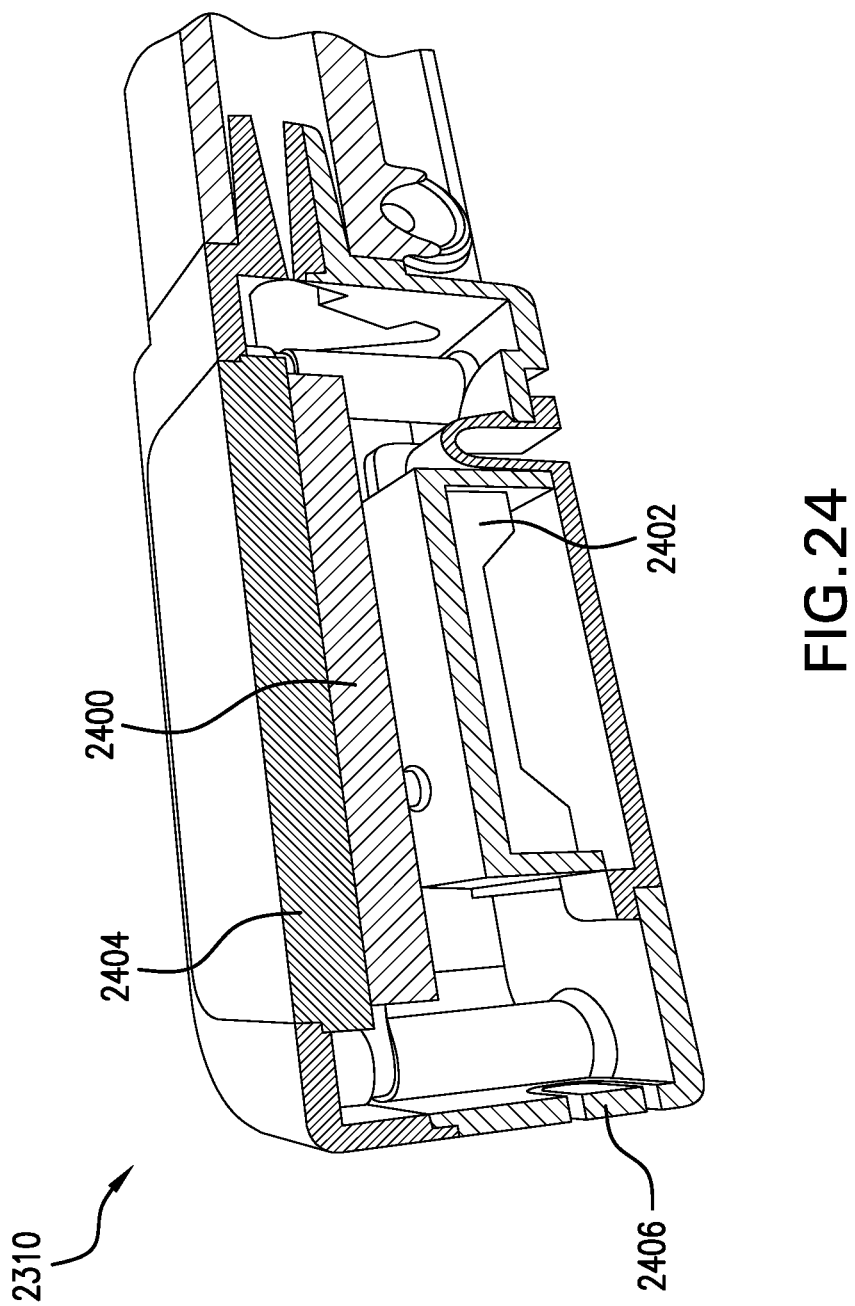
FIG. 24 is a cross-sectional view illustration of an electronics housing with electronic components therein according to some embodiments of the present disclosure.

FIG. 24 depicts the embodiment of the electronics housing (2310) with electronic components housed therein. In one or more embodiments, the electronics housing (2310) includes a printed circuit board (PCB) (2400) that is connected with one or more batteries (2402). The electronics housing (2310) may further comprise light emitting diodes (LEDs) which form the digital display displaying text (e.g., numbers) corresponding to a weight of an item (e.g., luggage) placed on the folding luggage scale when in use. The electronics housing (110) may further include a layer of glass (2404) that protects the electronic components within the electronics housing (110). Additionally, the electronics housing (2310) may include a power (on/off) button (2406) on an exterior surface of the electronics housing (2310) to control power to the folding luggage scale. This on/off button may also double as a metric/standard selector for switching between weight measurement units that are displayed on the LED digital display, or mobile application. The electronics housing (2310) may also include an additional PCB having wires which are attached to the other PCB and one or more batteries. In some embodiments, a portion (or all) of the electronics housing (2310) may be housed within a folding arm of the folding luggage scale. The electronics housing (110) may be formed in any suitable size and shape provided it is formed to perform its intended function.

In one or more embodiments, an electrical signal is sent to the PCB (2400) and a microcontroller unit (MCU) on the PCB (2400), via a plurality of electrical wires that traverse one or more of the folding arms and hinges. As is understood by one skilled in the art, a MCU may contain one or more processors along with a memory and programmable input/output peripherals. The MCU may be contained on a single integrated circuit chip. In some embodiments according to the present disclosure, the MCU implements an algorithm that collects all four, or five, sensor readings (depending on the folding luggage scale embodiment) and converts the signals into a weight.

Referring to FIG. 23, in one or more embodiments, the electronics housing (2310) includes all electronics associated with the folding luggage scale except for the load sensors and wires to the load sensors. In this embodiment, only sensor wires leave the electronics housing (2310) through an interface (2300) between the electronics housing (2310) and a connecting element (2302) (e.g., tube) which carries load sensor wires from the PCB.

Figure 2:
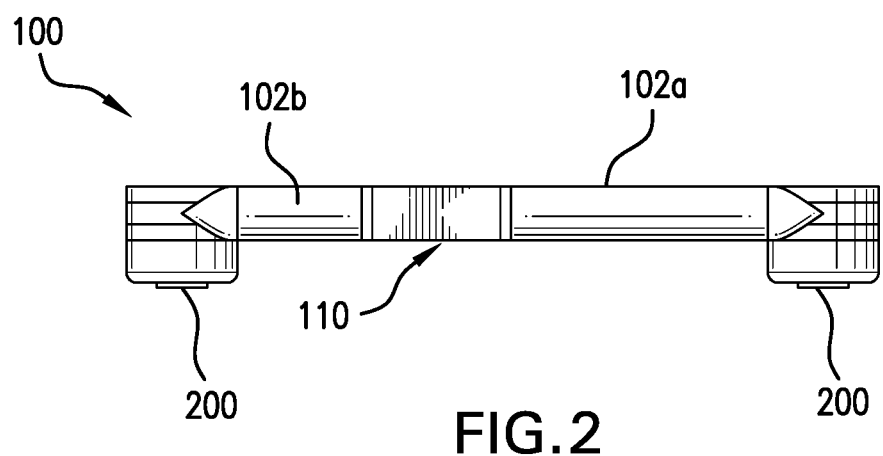
FIG. 2 is a front-view illustration of the folding luggage scale in FIG. 1 according to embodiments of the present disclosure.

The embodiment of the folding luggage scale (100) shown in FIG. 1 includes three hinges (106), one endpoint (104), and four load sensor housings (108). As understood by one skilled in the art, a load sensor, also referred to as a load cell, is an electronic device that converts tension and compression forces into a corresponding electrical signal. FIG. 22 illustrates an example load sensor (2200) that may be implemented in any of the folding luggage scale embodiments. FIG. 2 is a front-view illustration of the embodiment of the folding luggage scale (100) in FIG. 1. As shown in this view, each load sensor housing (108) includes a load sensor push-plate (200). The load sensor push-plate (200) has a metal button that is forced by the weight on it against the raised middle portion (or bubble) of the load sensor (not shown in this view). The force on the push-plate (200) causes a slight deflection of the middle bubble of the load sensor (FIG. 22, 2200), leading to a change in the resistance inside the load sensor. The change in resistance results in a change in voltage that is carried by wires to the PCB.

Figure 3:
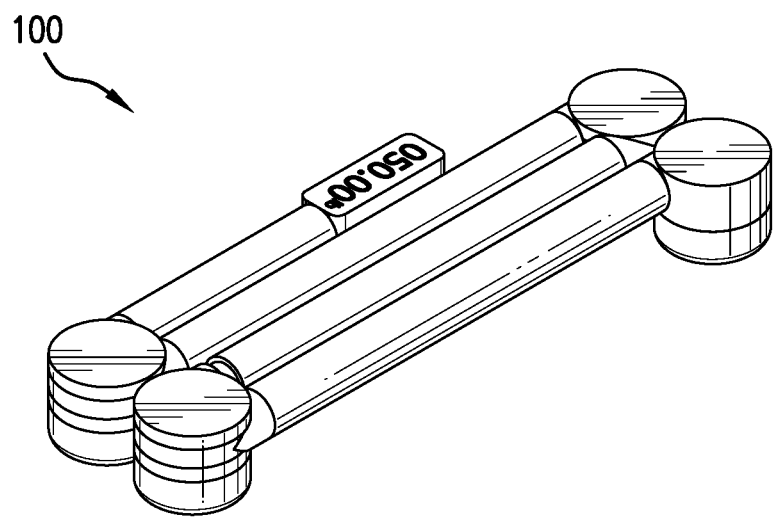
FIG. 3 is a top, perspective-view illustration of the folding luggage scale in FIG. 1 according to embodiments of the present disclosure.
Figure 4:
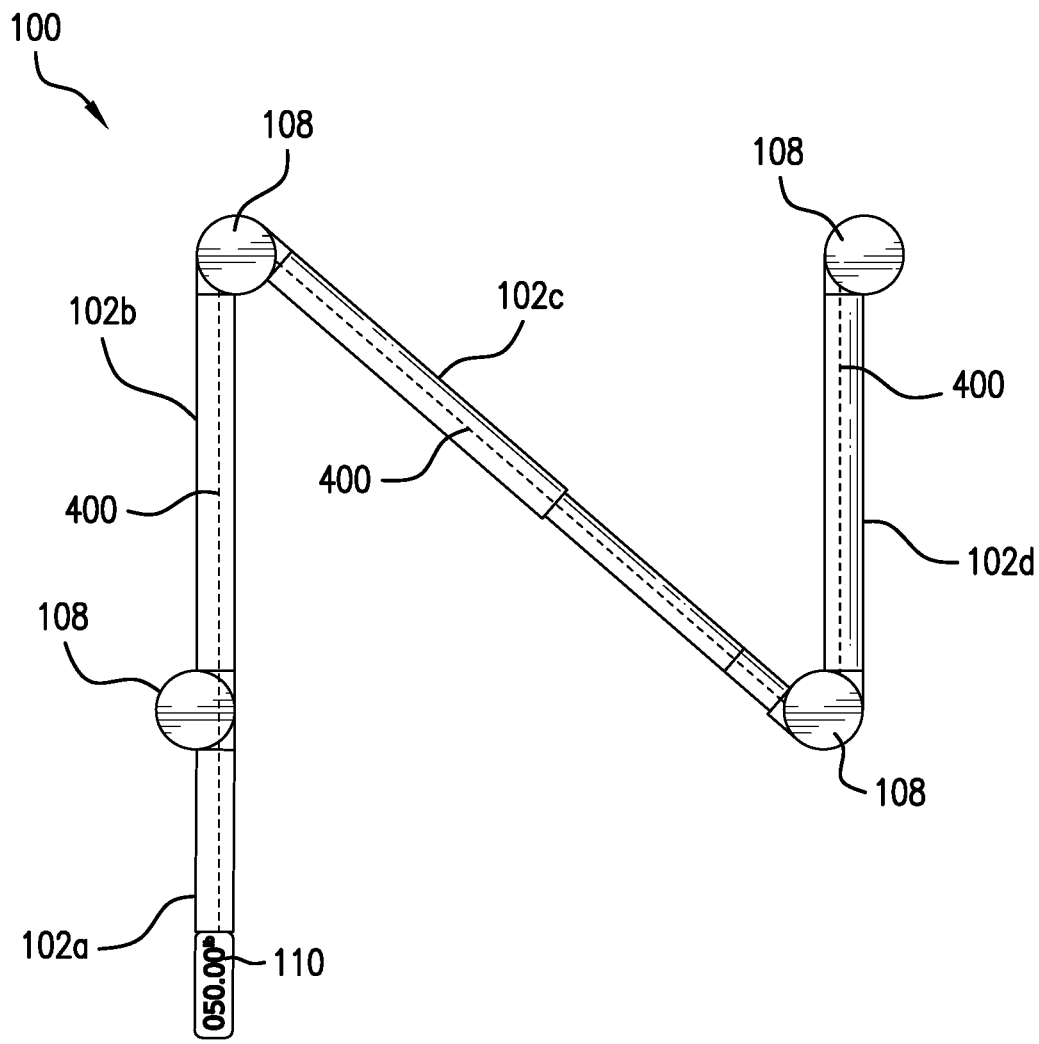
FIG. 4 is a top-view illustration of the folding luggage scale in FIG. 1 in an unfolded, functional position according to embodiments of the present disclosure.

FIG. 3 is a top, perspective-view of the embodiment of the folding luggage scale (100) in FIG. 1. FIG. 4 is a top-view illustration of the embodiment of the folding luggage scale (100) in FIG. 1 in its unfolded, functional position. As shown, the folding luggage scale (100) may include extendable, telescoping folding arms (e.g., 102b, 102c and 102d) that allow a user to increase the length of a folding arm (e.g., 102c) via an extension mechanism. In this embodiment, the extendable folding arm (102c) is the center, weight bearing arm. Any or all of the folding arms (102a), (102b), (102c), and (102d) may be extendable such that a length of the folding arm (e.g., 102c) is adjustable to accommodate different sizes and shapes of luggage.

In one or more embodiments, one or more of the folding arms (102a), (102b), (102c), and/or (102d) is a pair of tubular elements having different diameters, which form the mechanism by which a folding arm is extendable. The diameter of one of the tubular elements is less than that of the other tubular element, such that the tubular element having the smaller diameter can fit within the tubular element having the larger diameter. The extension mechanism may also include stopping elements to prevent the pair of tubular elements from completely separating. Additionally, the extension mechanism may comprise an anti-rotation element to maintain positioning of all of the load sensors in one plane at all times.

Figure 5:
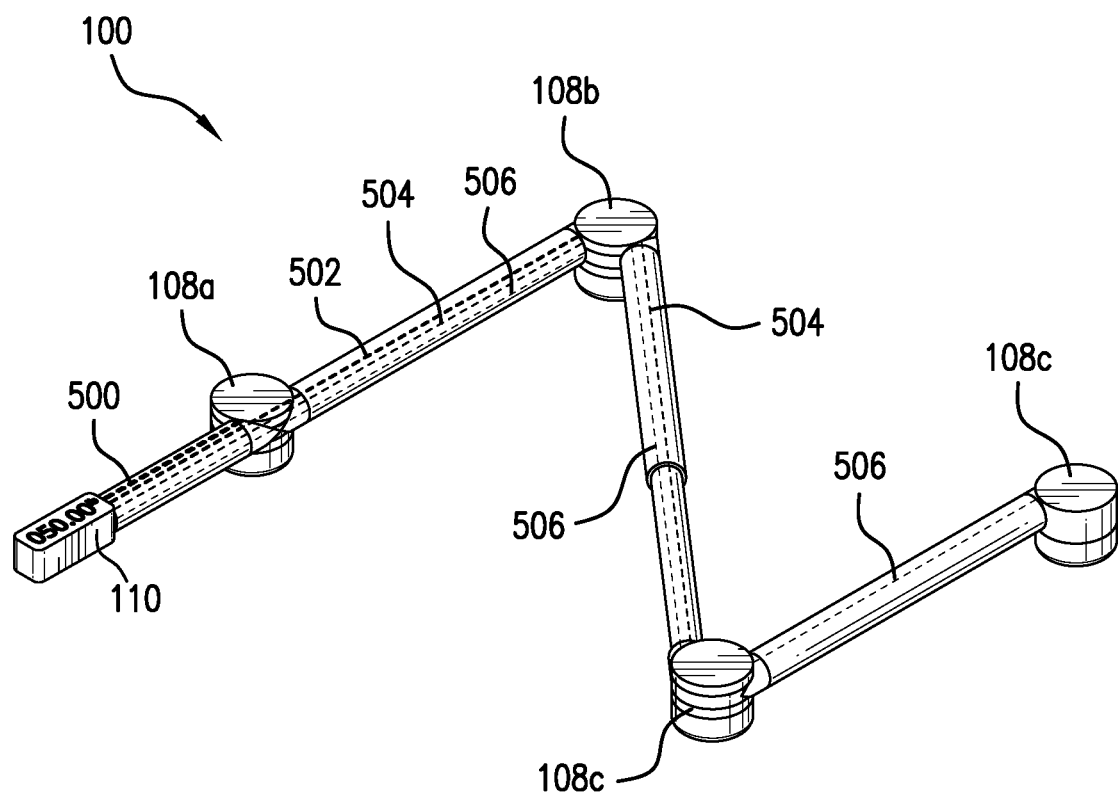
FIG. 5 is a top, perspective-view illustration of the folding luggage scale in FIG. 1 in its unfolded, functional position according to embodiments of the present disclosure.

FIG. 5 is a top, perspective-view illustration of the embodiment of the folding luggage scale (100) in FIG. 1 in its unfolded, functional position. At least one set of electrical wires traverses one or more of the folding arms and hinges and connects with the electronics housing (110). The set of electrical wires may include separate wires or ribbon cables and two or more of the wires may have different lengths due to the need for wires to extend from the electronics housing (110) to the furthest load sensor. In the embodiment shown in FIG. 5, there are multiple bundles of 3-wire trunks. Each of the bundles extends from the electronics housing (110). A first bundle of wires (500) extends from the electronics housing (110) to a first load sensor housing (108a). A second bundle of wires (502) extends from the electronics housing (110) to a second load sensor housing (108b). A third bundle of wires (504) extends from the electronics housing (110) to a third load sensor housing. (108c). A fourth bundle of wires (506) extends from the electronics housing (110) to a fourth load sensor housing (108d).

Figure 6:
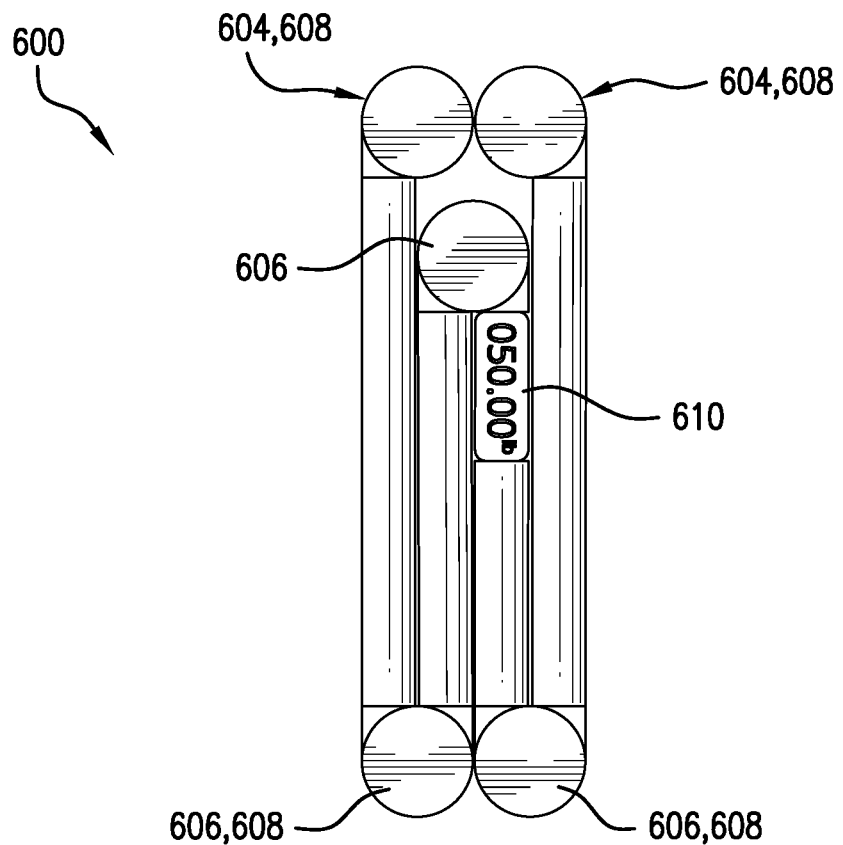
FIG. 6 is a top-view illustration of a folding luggage scale in a folded position according to embodiments of the present disclosure.
Figure 7:
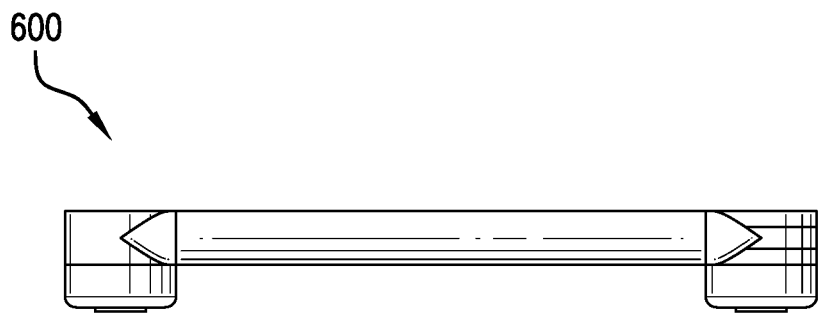
FIG. 7 is a front-view illustration of the folding luggage scale in FIG. 6 according to embodiments of the present disclosure.
Figure 8:
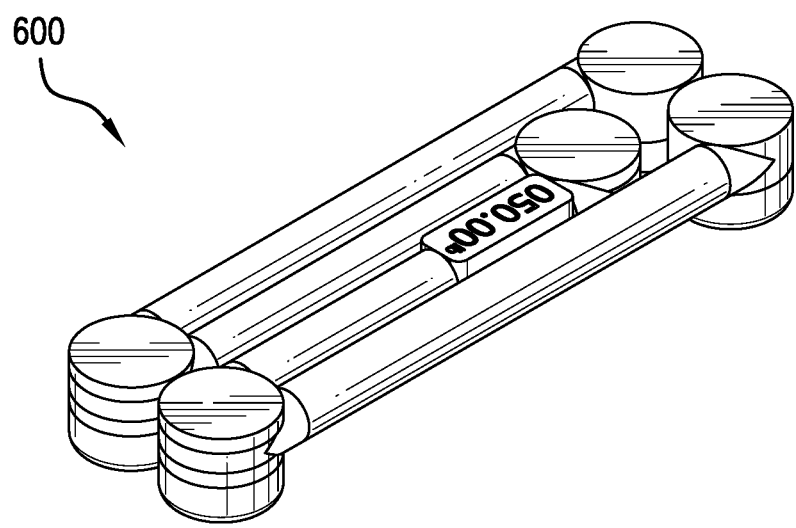
FIG. 8 is a top, perspective-view illustration of the folding luggage scale in FIG. 6 according to embodiments of the present disclosure.
Figure 9:
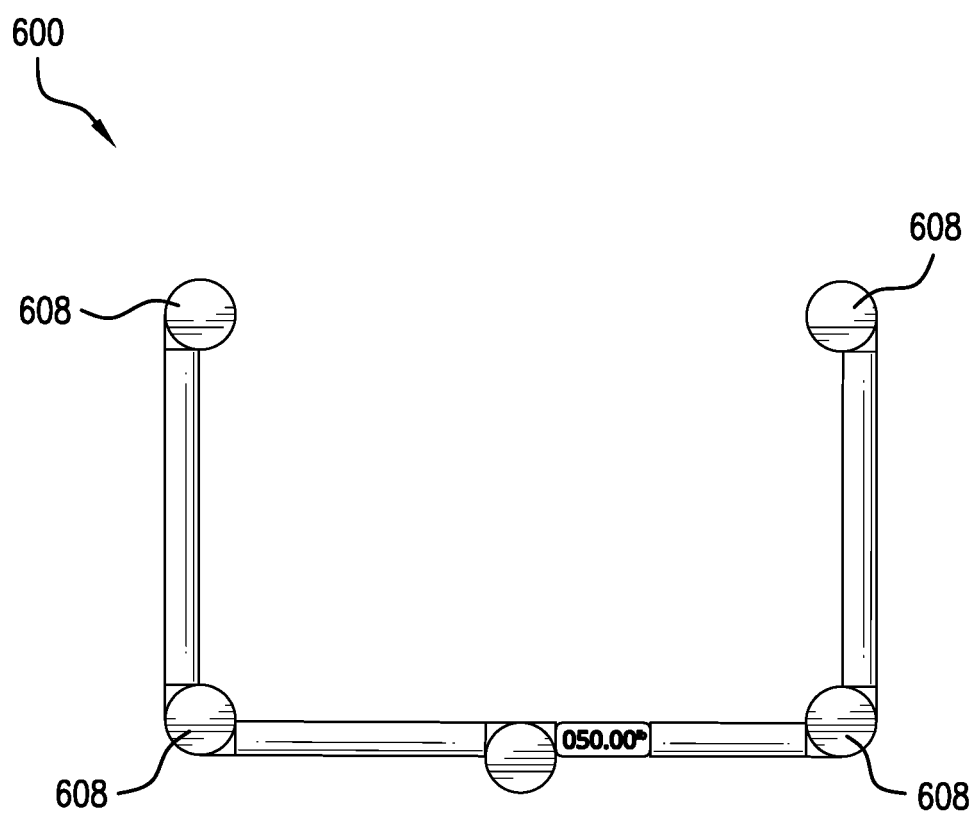
FIG. 9 is a top-view illustration of the folding luggage scale in FIG. 6 in an unfolded, functional position according to embodiments of the present disclosure.
Figure 10:
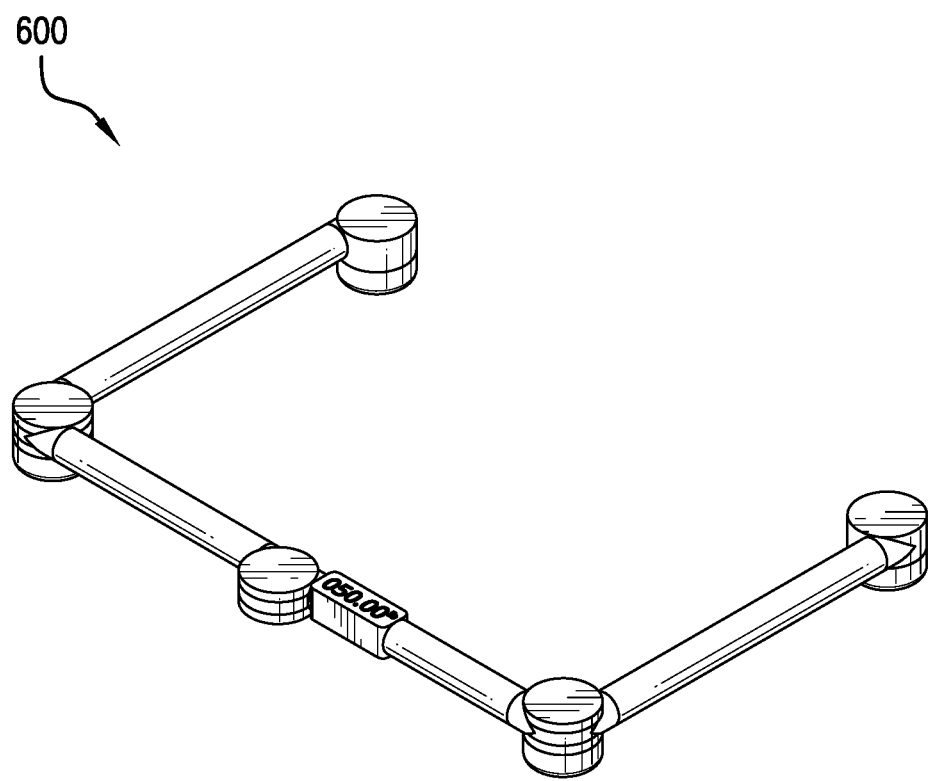
FIG. 10 is a top, perspective-view illustration of the folding luggage scale in FIG. 6 in its unfolded, functional position according to embodiments of the present disclosure.

FIG. 6 is a top-view illustration of another embodiment of a folding luggage scale (600) depicted in a folded position. This embodiment includes three hinges (606), two endpoints (604), and four load sensor housings (608). FIG. 7 is a front-view illustration of the embodiment of the folding luggage scale (600) in FIG. 6. FIG. 8 is a top, perspective-view of the embodiment of the folding luggage scale (600) in FIG. 6. FIG. 9 is a top-view illustration of the embodiment of the folding luggage scale (600) in FIG. 6 in its unfolded, functional position. FIG. 10 is a top, perspective-view illustration of the embodiment of the folding luggage scale (600) in FIG. 6 in its unfolded, functional position.

Figure 11:
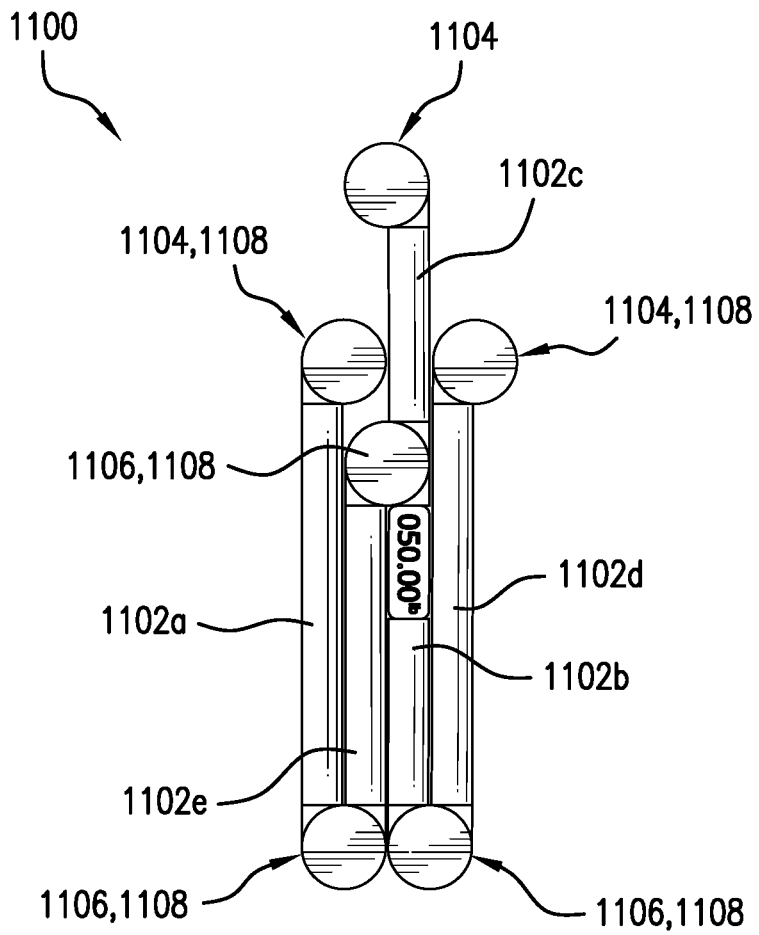
FIG. 11 is a top-view illustration of a folding luggage scale in a folded position according to embodiments of the present disclosure.
Figure 12:
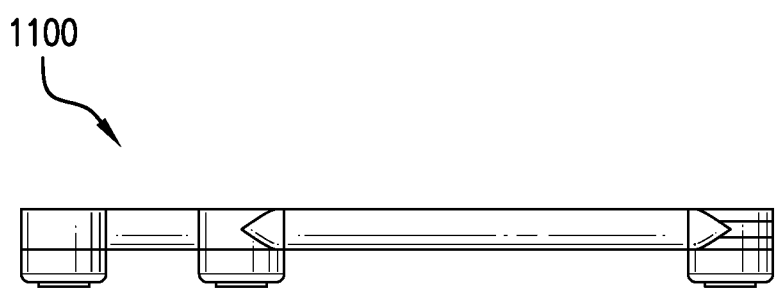
FIG. 12 is a front-view illustration of the folding luggage scale in FIG. 11 according to embodiments of the present disclosure.
Figure 13:
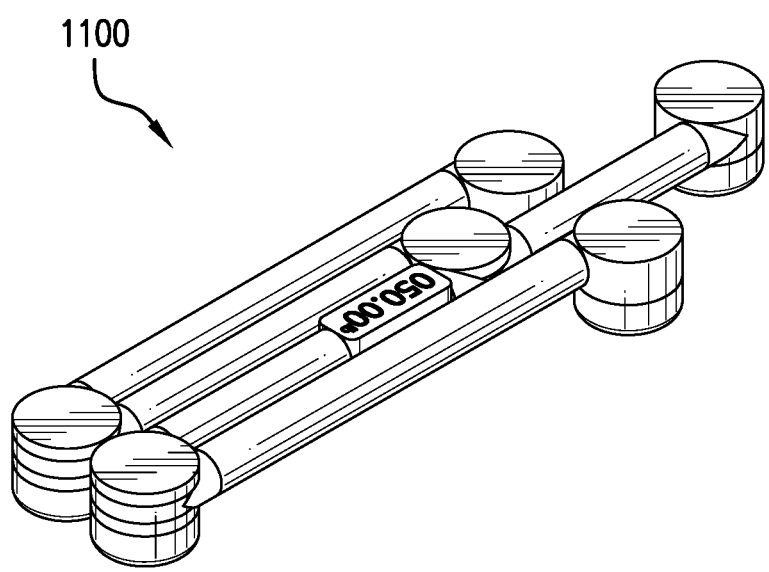
FIG. 13 is a top, perspective-view illustration of the folding luggage scale in FIG. 11 according to embodiments of the present disclosure.

FIG. 11 is a top-view illustration of another embodiment of a folding luggage scale (1100) depicted in a folded position. This embodiment includes three hinges (1106), three endpoints (1104), and five load sensor housings (1108). This embodiment also include five folding arms (1102a), (1102b), (1102c), (1102d), and (1102e). FIG. 12 is a front-view illustration of the embodiment of the folding luggage scale (1100) in FIG. 11. FIG. 13 is a top, perspective-view of the embodiment of the folding luggage scale (1100) in FIG. 11.

Figure 14:
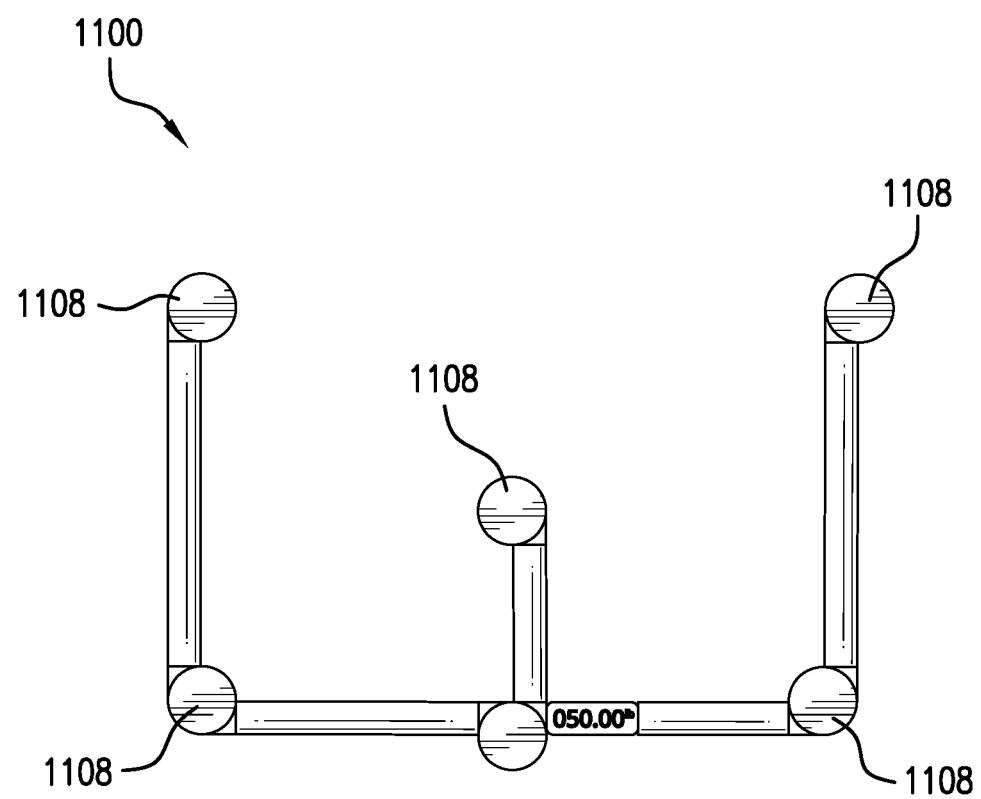
FIG. 14 is a top-view illustration of the folding luggage scale in FIG. 11 in an unfolded, functional position according to embodiments of the present disclosure.
Figure 15:
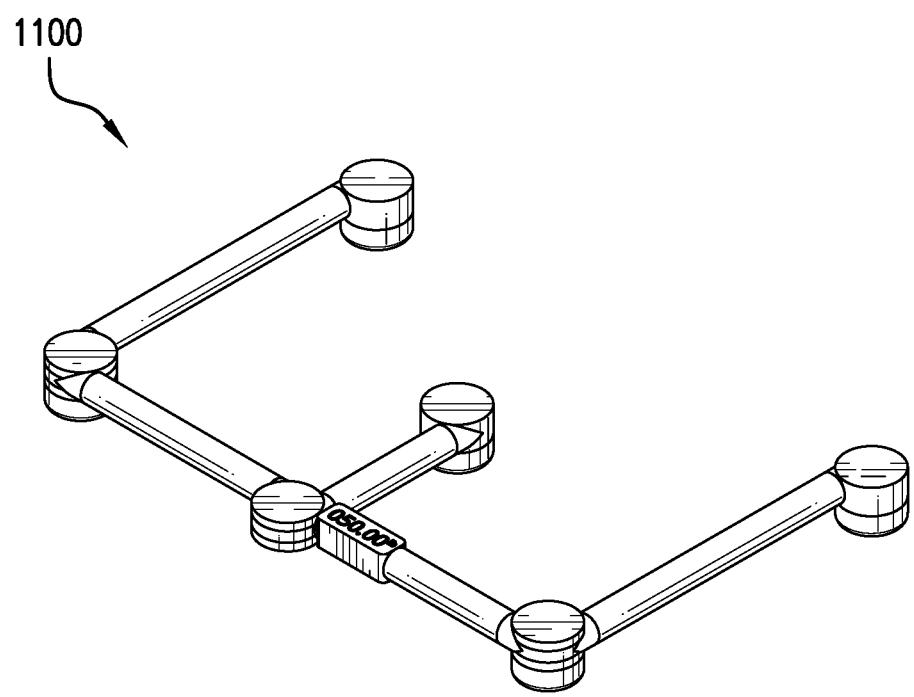
FIG. 15 is a top, perspective-view illustration of the folding luggage scale in FIG. 11 in its unfolded, functional position according to embodiments of the present disclosure.

FIG. 14 is a top-view illustration of the embodiment of the folding luggage scale (1100) in FIG. 11 in its unfolded, functional position. In this embodiment one of the five load sensor housings (1108) is at the center of the folding luggage scale (1100). FIG. 15 is a top, perspective-view illustration of the embodiment of the folding luggage scale (1100) in FIG. 11 in its unfolded, functional position.

Figure 16:
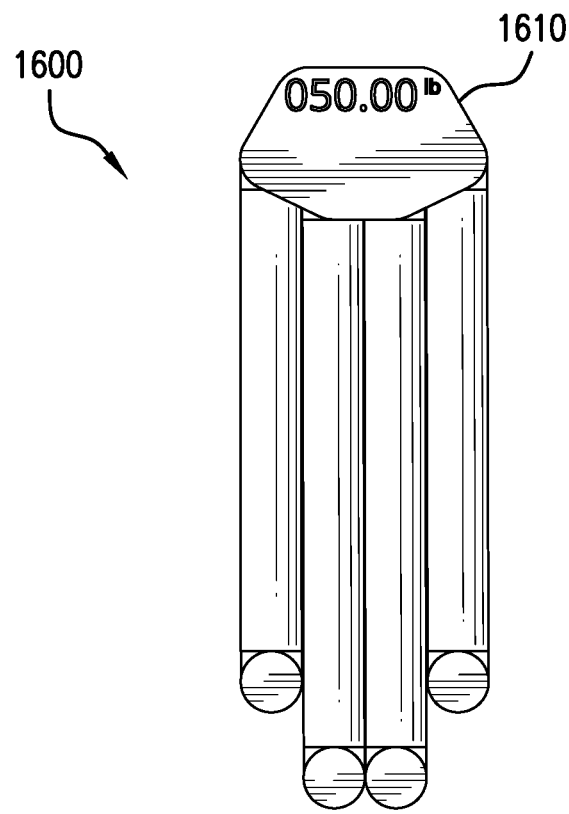
FIG. 16 is a top-view illustration of a folding luggage scale in a folded position according to embodiments of the present disclosure.

FIG. 16 is a top-view illustration of another embodiment of a folding luggage scale (1600) depicted in a folded position. In this embodiment, rather than being in line with one of the arms, the electronics housing (1610) is positioned at the top of the folding luggage scale (1600) in the folded position and at its center in the unfolded position (see FIG. 19). This embodiment provides a more compact design when folded and may not require any telescoping folding arms.

Figure 17:
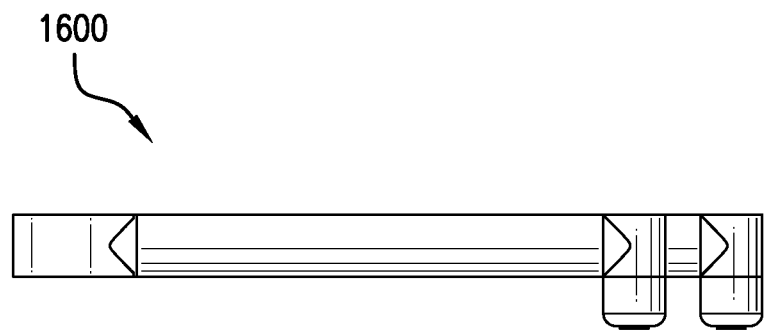
FIG. 17 is a front-view illustration of the folding luggage scale in FIG. 16 according to embodiments of the present disclosure.

FIG. 17 is a front-view illustration of the embodiment of the folding luggage scale (1600) in FIG. 16. FIG. 18 is a top, perspective-view of the embodiment of the folding luggage scale (1600) in FIG. 16. FIG. 19 is a top-view illustration of the embodiment of the folding luggage scale (1600) in FIG. 16 in its unfolded, functional position. FIG. 20 is a top, perspective-view illustration of the embodiment of the folding luggage scale (1600) in FIG. 16 in its unfolded, functional position.

In one or more of the embodiments, the load sensors may be connected to an electronic component (e.g., PCB) via electrical wires of different lengths. The different lengths of wire may be needed due to the varying distance of each load sensor from the electronics housing. For instance, one load sensor in the folding luggage scale may be closer to the electronics housing than another load sensor. The closer load sensor may have a shorter electrical wire, while the further load sensor may have a longer electrical wire. Typical scales use identical wire lengths for four load sensors because each load sensor is positioned approximately equidistant from the main PCB.

Each embodiment of the folding luggage scale described above is configured to weigh luggage of all types and sizes, including duffel bags and soft-sided suitcases. Due to its light weight (approximately one-to-two pounds) and folding configuration, the folding luggage scale can be folded and placed in the luggage for travel after use. In one or more embodiments, one or more of the folding arms may telescope in length from approximately 11 inches to approximately 15 inches. The folding arm that extends across the middle/center of the folding luggage scale in its unfolded, functional configuration may have a length of approximately 11 inches to approximately 22 inches in its extended position. The stored length of the folding luggage scale may be approximately 12 inches.

To use each embodiment of the folding luggage scale, a user may unfold each of the folding arms into its fully extended position via the hinges. Then, the user places the folding portable luggage scale on the ground, a flat, stable surface, or an existing luggage rack. Finally, the user places an item of luggage to be weighed onto the folding portable luggage scale and waits for the weight of the item to appear on the digital display.

Unlike existing luggage scales, which attach to a closed bag or suitcase, the folding luggage scale does not require the luggage to be closed, zipped, and/or picked up, as is required by existing baggage weighing devices that attach to the handle of the luggage. The user may use the folding luggage scale while in the process of packing in the privacy of their home or hotel room to determine what should or should not be included in the luggage.

In one or more embodiments, the folding luggage scale includes a mechanism that uses wireless communication (e.g., Bluetooth®) technology from the electronic component to allow for wireless communication of the weight of the luggage placed on the folding luggage scale, and transmission of this information to a mobile software application (app) on a mobile device, such as a smartphone.

A backend server will collect information from airlines, passenger train companies, and cruise ship companies for displaying on the mobile software app. As understood by one skilled in the art, a backend server is responsible for storing and organizing data, communicating with the frontend, sending and receiving information to be displayed as a webpage or mobile app.

Figure 21:
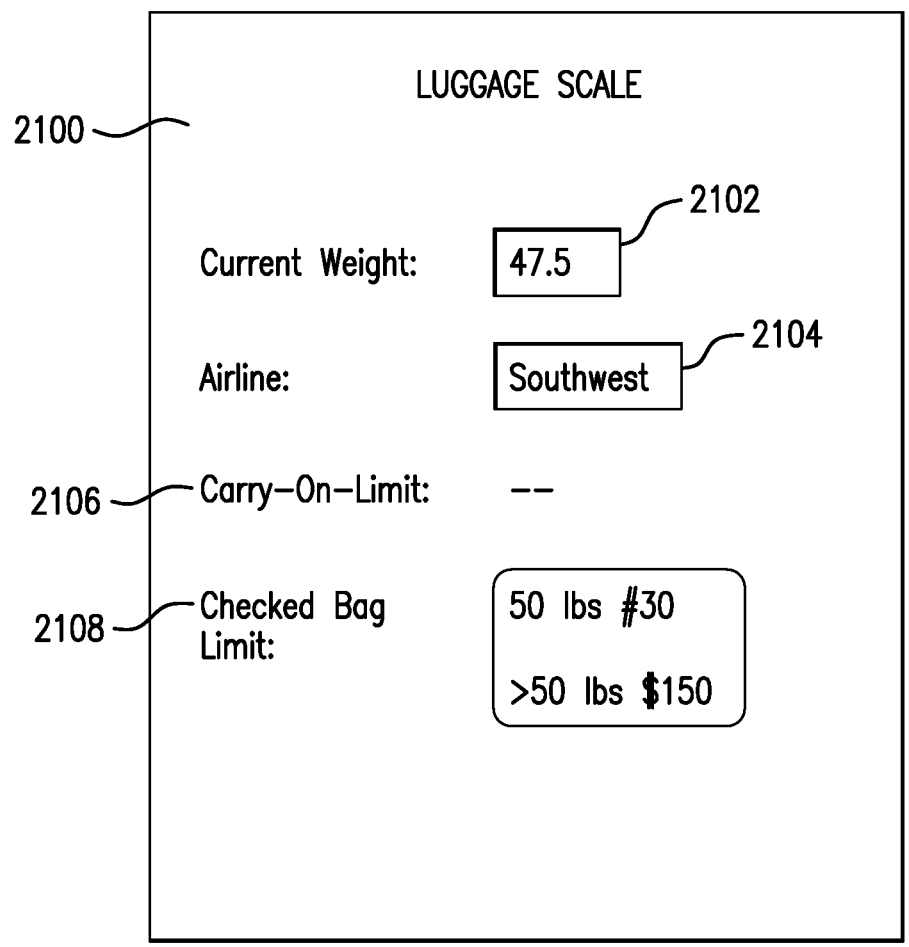
FIG. 21 is an illustration of a screenshot of a mobile application used in conjunction with the folding luggage scale according to some embodiments of the present disclosure.

FIG. 21 depicts a non-limiting example of a screenshot 2100 of the mobile app used in conjunction with the present invention. In the embodiment shown, the screenshot 2100 shows a weight reading 2102 for the luggage as obtained from the electronic component of the folding luggage scale; a drop-down airline selection menu 2104; a flight number entry, a premier status with that airline, checked-bag luggage limit 2106; and checked bag and associated fees 2108. In addition, the mobile app may be configured to display airline restrictions for batteries, other restricted items, size of luggage, and other relevant travel details based on the user's geographical location given either by the user's input or by the geographical positioning system (GPS) of the mobile device. As can be appreciated by one skilled in the art, any variety of features and selections that may be useful to a traveler utilizing the folding luggage scale may be implemented in the mobile app.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

What is claimed is:

1. A folding portable luggage scale, comprising:
    a plurality of folding arms connected via a plurality of rotatable hinges, wherein each folding arm comprises a pair of ends and a length extending between the pair of ends;
    at least one endpoint positioned at an end of at least one folding arm,
    wherein the at least one endpoint is substantially similar in size and shape to one or more of the rotatable hinges,
    wherein the at least one endpoint provides a surface for luggage;
    a plurality of load sensors;
    an electronics housing comprising a plurality of electronic components and a digital display; and
    a plurality of electrical wires connecting each load sensor in the plurality of load sensors with the electronics housing.

2. The folding portable luggage scale as set forth in claim 1, wherein the plurality of wires are housed in a combination of the plurality of folding arms and at least one rotatable hinge.

3. The folding portable luggage scale as set forth in claim 1, wherein one or more of the plurality of rotatable hinges comprises a load sensor housing having a load sensor therein.

4. The folding portable luggage scale as set forth in claim 1, wherein the plurality of load sensors comprises four load sensors.

5. The folding portable luggage scale as set forth in claim 1, wherein the plurality of load sensors comprises five load sensors.

6. The folding portable luggage scale as set forth in claim 1, wherein each folding arm is a substantially hollow tube.

7. The folding luggage scale as set forth in claim 1, wherein at least one of the plurality of folding arms comprises an extension mechanism.

8. The folding luggage scale as set forth in claim 1, wherein at least one of the electronic components is a printed circuit board (PCB).

9. The folding luggage scale as set forth in claim 8, wherein the PCB comprises a microcontroller unit (MCU).

10. The folding luggage scale as set forth in claim 1, wherein the plurality of electrical wires comprises at least two electrical wires of different lengths.

11. The folding luggage scale as set forth in claim 1, wherein the electronics housing is configured to wirelessly communicate with a mobile software application.

12. The folding luggage scale as set forth in claim 1, wherein the electronics housing is positioned at one of the pair of ends of one of the folding arms.

13. The folding luggage scale as set forth in claim 1, wherein the electronics housing is positioned along the length of one of the folding arms between the pair of ends.

14. The folding luggage scale as set forth in claim 1, further wherein the plurality of rotatable hinges are embedded within a central body member, and wherein each folding arm extends radially from the central body member.

15. A method for forming a folding portable luggage scale, comprising acts of:
    connecting a plurality of folding arms via a plurality of rotatable hinges;
    positioning at least one endpoint at an end of at least one folding arm,
    wherein the at least one endpoint is formed to be substantially similar in size and shape to one or more of the rotatable hinges,
    attaching a load sensor with at least one folding arm;
    using a plurality of electrical wires, connecting each load sensor with an electronics housing comprising a plurality of electronic components and a digital display.

16. The method as set forth in claim 15, further comprising an act of positioning the plurality of electrical wires within a combination of the plurality of folding arms and at least one rotatable hinge.

17. The method as set forth in claim 15, further comprising an act of forming the plurality of folding arms to be substantially hollow tubes.

18. The method as set forth in claim 15, further comprising an act of forming at least one of the plurality of folding arms to be extendable.

19. The method as set forth in claim 15, further comprising an act of forming at least two of the electrical wires to have different lengths.

20. The method as set forth in claim 15, further comprising an act of configuring the electronic housing to be capable of wirelessly communicating with a mobile software application.

* * * * *